US006885266B2

(12) United States Patent
Ochi-Okorie

(10) Patent No.: US 6,885,266 B2
(45) Date of Patent: Apr. 26, 2005

(54) AUTOMOTIVE BALL SYSTEM

(76) Inventor: Chidiebere E. Ochi-Okorie, 127 Hidden Lake Dr., League City, TX (US) 77573

( * ) Notice: Subject to any disclaimer, the term of this patent is extended or adjusted under 35 U.S.C. 154(b) by 0 days.

(21) Appl. No.: 10/771,084

(22) Filed: Feb. 3, 2004

(65) Prior Publication Data

US 2004/0251995 A1 Dec. 16, 2004

Related U.S. Application Data

(60) Provisional application No. 60/477,497, filed on Jun. 11, 2003.

(51) Int. Cl.[7] ................................. H01F 5/00
(52) U.S. Cl. ................ 335/296; 335/299; 310/90.5
(58) Field of Search ................. 335/296–306; 310/90.5, 300; 40/426

(56) References Cited

U.S. PATENT DOCUMENTS 4,874,346 A * 10/1989 Wachspress ................ 446/484

* cited by examiner

Primary Examiner—Ramon M. Barrera

(57) ABSTRACT

The invention introduces a method of locomotion that relies on electronically-controlled arrays of electromagnets that permit a spherical or disk-shaped object to move across a magnetic plane by rolling, and also permit the same object to levitate and remain suspended above a surface without further energy expenditure. Another aspect of the invention is a gaming system that implements the above method of locomotion and additionally employs other supporting technologies.

19 Claims, 10 Drawing Sheets

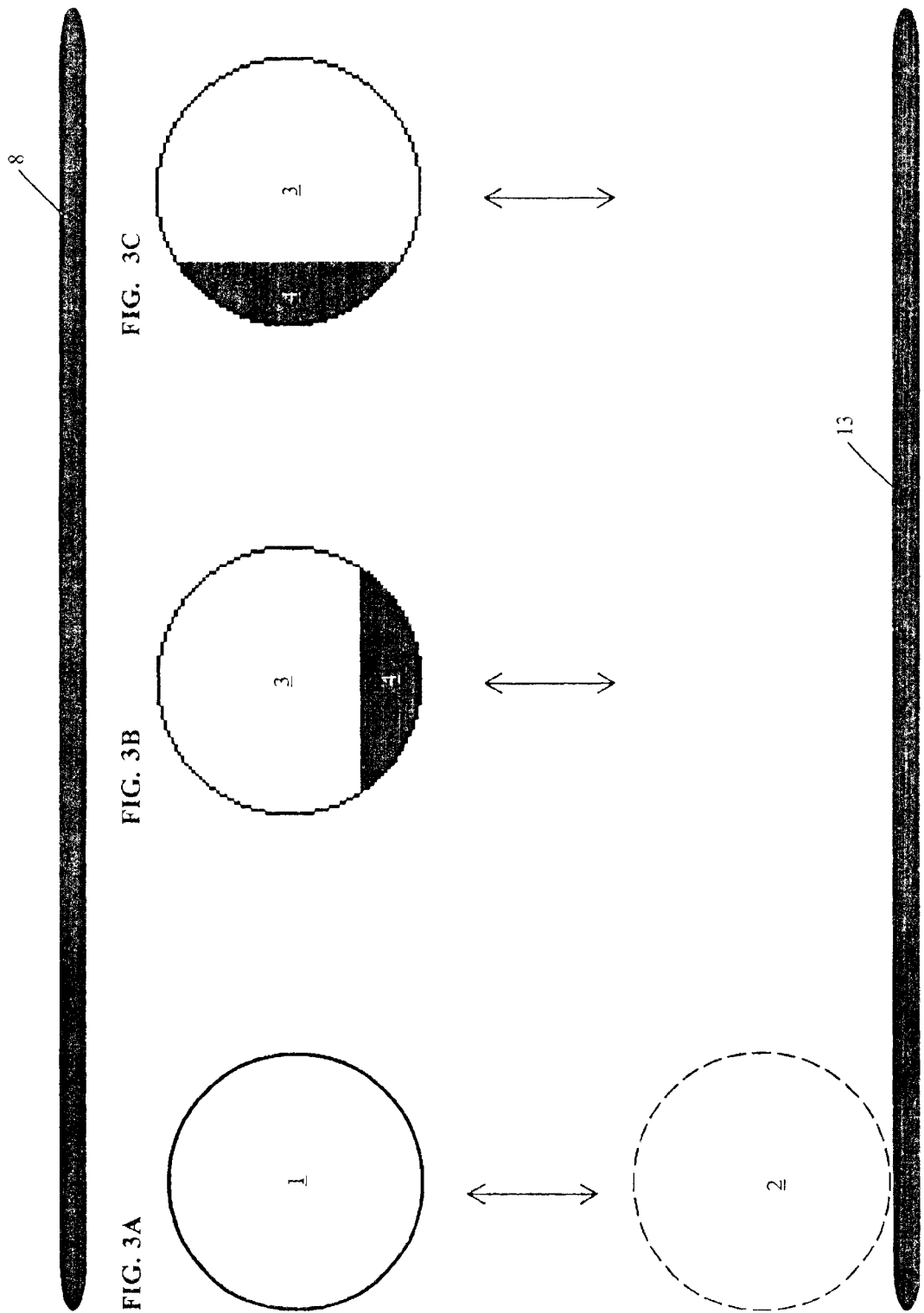

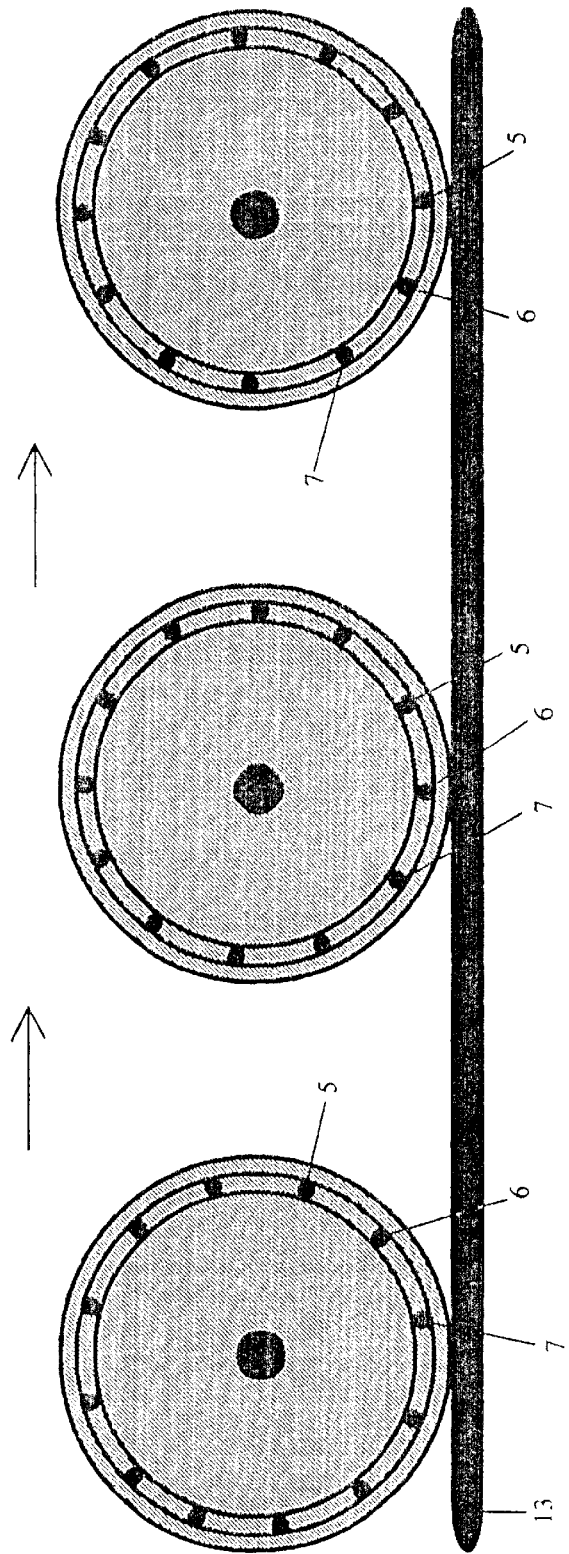
FIG. 4A  FIG. 4B  FIG. 4C

AUTOMOTIVE BALL SYSTEM

CROSS-REFERENCE TO RELATED APPLICATIONS

Under 35 USC 119(e)(1), this application claims priority of U.S. provisional patent application No. 60/477,497 filed Jun. 11, 2003.

STATEMENT REGARDING FEDERALLY SPONSORED RESEARCH OR DEVELOPMENT

Not Applicable.

REFERENCE TO LISTING, TABLE, OR APPENDIX

Not Applicable.

BACKGROUND OF THE INVENTION

Existing technologies for locomotion include locomotion by wheel as exemplified by land vehicles, propulsion as with aircraft, and magnet-based motion such as with maglev trains. The invention introduces another method of locomotion, where this method is partly analogous to locomotion by wheel and operates by magnetic interactions. Another aspect of the invention is a gaming system that implements the above described method of locomotion and that additionally consists of other technologies that are also components of the invention. Knowledge and principles from the fields of physics, electronics, and mathematics have been applied in the development of the technologies that comprise the invention.

BRIEF SUMMARY OF THE INVENTION

A component of the invention is an aquarium-like transparent box or container, which is designated the motion environment. This motion environment holds liquid, preferably water; automotive balls, as will be defined in progress, are suspended in the liquid medium and neither float nor sink due to the equality of their density with the density of the surrounding liquid medium.

The automotive balls, which are spherical in shape and form, have embedded in them several electromagnets. The purpose of these embedded electromagnets is to cause the motion of the normally stationary automotive balls when one or more of the electromagnets is activated.

The embedded electromagnets cause the automotive balls to levitate above the floor or descend toward the floor of the motion environment, as dependent on other processes. In addition, when an automotive ball is on the floor, roof, or other plane surface of the motion environment, it can be made to roll in any direction as motivated by coordinated activation and deactivation of the several electromagnets embedded in the automotive ball.

According to a scheme presented, an automotive ball may be used to determine relative to itself the position, or location, of other automotive balls in the motion environment by detecting magnetic fields generated by those other automotive balls. This ability is useful to the possible objectives of an automotive ball game as presented below.

A player of an automotive ball game may navigate automotive balls three-dimensionally to new positions in a motion environment. The objectives of an automotive ball game may include the strategic repositioning of an automotive ball(s), and possibly other game elements, according to game rules. Such game rules may specify the relative positioning and configurations in which game elements (which are primarily or entirely automotive balls) must be arranged in order for a player(s) to win the game. Challenges in winning the game may also include avoiding contact with enemy game elements, which may pursue a player's game element; and time pressure on a player(s) to complete a game task.

An automotive ball game may be played by one or more players; in a game competition, one of the competitors may be the central computer of the game system.

Each game element may contain a controller circuitry. The purpose of the controller circuitry is to direct the functioning of the game element.

The controller circuitry in each game element communicates with the central computer. Communication data exchanged between the controller circuitry in a game element and the central computer is carried preferably by radio frequency (RF) or less preferably by infrared light.

Electricity that powers an automotive ball is derived from photo (solar) cells within the automotive ball; these photo cells ultimately receive light from a light source(s) in the motion environment.

BRIEF DESCRIPTION OF FIGURES

FIG. 3A is a conceptual diagram demonstrating the ability of said spherical automotive balls to levitate and to descend in the liquid medium, as ultimately controlled by a game player(s) and/or computer device associated with the system.

FIGS. 3B & 3C are conceptual diagrams illustrating a general mechanism by which an automotive ball, regardless of its rotational orientation in the liquid medium, may levitate or descend in the liquid medium. Two orientations are shown for said automotive ball, one in each figure.

FIGS. 4A, 4B, and 4C are conceptual, hemispherical cross-sectional views of FIG. 9 that demonstrate the method by which an automotive ball may move in any direction on a magnetic plane. Only selected components of the automotive ball interior are depicted.

DETAILED DESCRIPTION OF THE INVENTION

Figure 1:
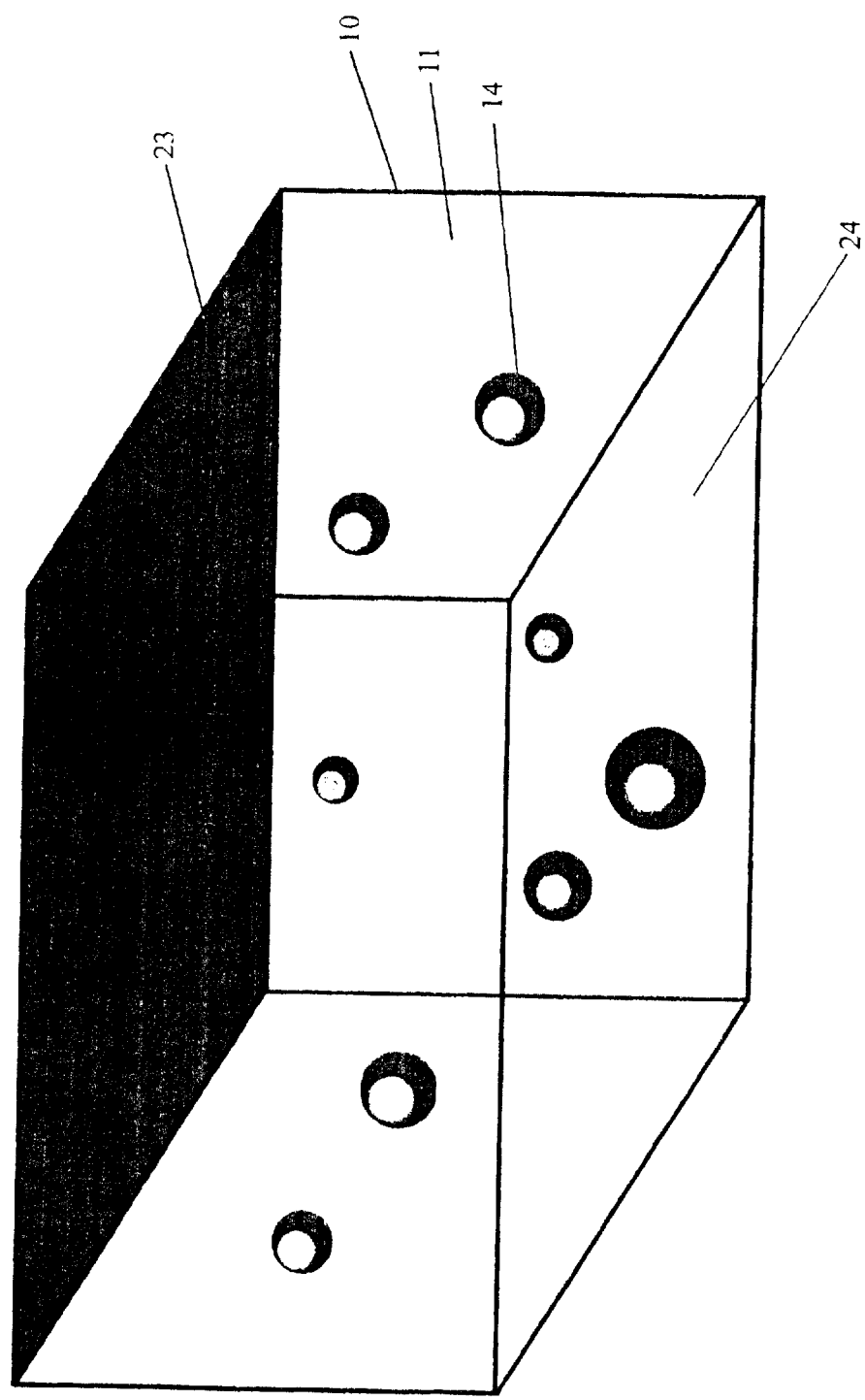
FIG. 1 is a conceptual overview of the design of the invention, showing a motion environment and automotive balls within this motion environment; this view is similar to a rectangular aquarium viewed cornerwise; and the said automotive balls that are shown are suspended at different heights in a liquid medium.

FIG. 1 shows a general design of the motion environment, which has a roof 23, a floor 24, and transparent plastic or glass walls 10. Several automotive balls are shown, one of which is labeled 14. The motion environment is filled with a liquid 11, preferably water, in which automotive balls can be suspended motionlessly.

Figure 2:
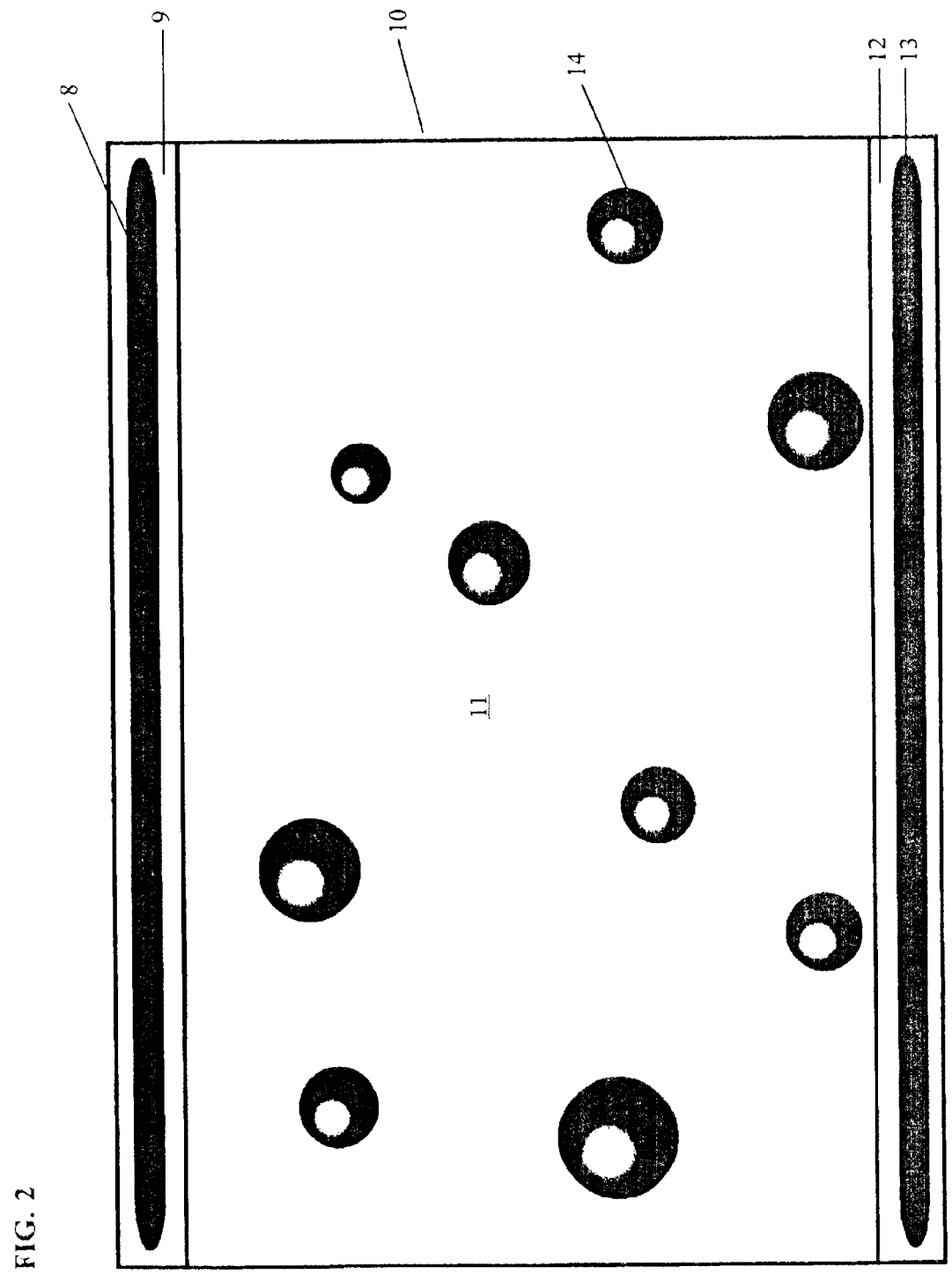
FIG. 2 is a conceptual overview for the design of the invention and is similar to FIG. 1, except that the rectangular motion environment is viewed from one side.
Figure 6:
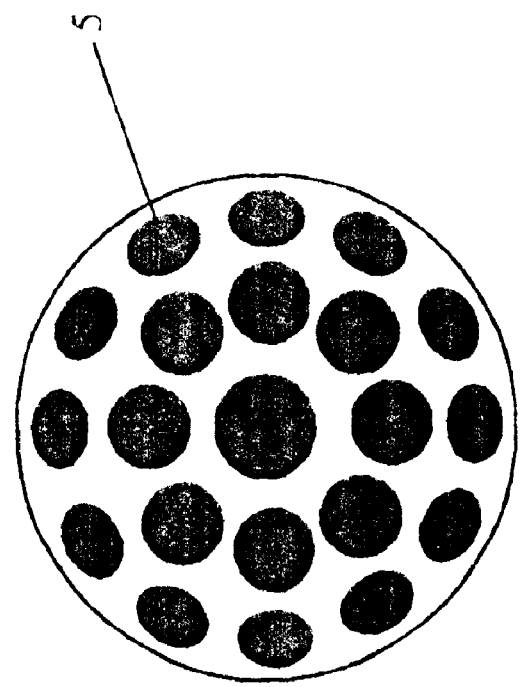
FIG. 6 is a conceptual diagram showing electromagnets within an automotive ball that cause the automotive ball to move in the motion environment. The outer surface of said automotive ball has been stripped to show electromagnets that are positioned on an inner layer of the automotive ball.

Each automotive ball 14 in FIG. 1 and FIG. 2 is equipped with several embedded electromagnets, one of which is labeled 5 in FIG. 6 where these electromagnets are exposed. The electromagnets may be operated in one of three modes at any given time. In the first mode, or mobile mode, the electromagnets cause the automotive balls to move within the motion environment. In the second mode, or transmission mode, the electromagnets generate magnetic fields used for signaling. In the third mode, or reception mode, the electromagnets act as detectors of an external magnetic field(s) used for signaling. This external magnetic field(s) is of time-variable strength (fluctuates) and thereby induces a current in the electromagnets.

The electromagnets switch from one mode to another to carry out a desired function. Carrying out a particular function may involve switching very quickly and frequently between modes. The several electromagnets in an automotive ball may be operated individually or simultaneously.

Automotive balls are capable of levitation and descent within the liquid medium contained in the motion environment. The method by which such vertical positioning is accomplished is described as follows. In FIG. 3A, an automotive ball 1 remains suspended in the liquid contained in the motion environment. The automotive ball neither sinks nor floats as the density of the automotive ball is equal to that of the surrounding liquid medium. However, the automotive ball can be motivated to descend 2 or levitate 1 by use of electromagnets embedded in the automotive ball. When one or a subset of these electromagnets is powered by electricity (activated), the automotive ball becomes magnetically attracted to a large permanent magnet 13 beneath the floor of the motion environment, as shown in FIG. 1. At this time, the automotive ball is also magnetically repelled away from the roof of the motion environment by a large permanent magnet 8 within the roof. The effect of this attraction to the floor and repulsion from the roof is for the automotive ball to descend toward the floor of the motion environment.

The electromagnet(s) in the automotive ball is attracted to the floor of the motion environment, whereas it is repelled from the roof. These opposite reactions are achieved by orienting the south pole of the floor permanent magnet 13 inward into the motion environment while orienting the north pole of the roof permanent magnet 8 inward into the motion environment, or vice versa. Thus, an electromagnet is attracted to one permanent magnet and repelled by the other.

If the direction of current flow is reversed in the above electromagnet(s), the automotive ball levitates instead of descend such that the opposite effect is observed from that described above. In that case, an automotive ball can be made to levitate or descend, depending on the direction of current flowing through its electromagnet(s).

FIG. 3B shows that a subset of the electromagnets in an automotive ball may be activated in order to cause levitation or descent of the automotive ball. The activated subset of electromagnets is present in the shaded portion 4 of the automotive ball. Electromagnets in the non-shaded portion 3 of the automotive ball are not activated at this time.

The purpose of activating only a subset of the electromagnets in an automotive ball is to reduce energy expenditure during the operation of the electromagnets.

FIG. 3C is comparable to FIG. 3B, except that here the automotive ball is shown in a different relative orientation. The purpose of FIG. 3C is to illustrate that the mechanism for levitation and descent of the automotive ball, as described above, can operate regardless of the relative orientation of the automotive ball.

Following is a description of the mechanism whereby an automotive ball may move in any direction on a horizontal or tilted plane by rolling. This plane may be the floor, roof, or other suitable plane of the motion environment.

FIG. 6 shows that an automotive ball, which is spherical in shape, has embedded in it several electromagnets, one of which is labeled 5. These electromagnets may be positioned beneath the outer surface of the automotive ball, being present throughout the automotive ball in proximity to its outer surface.

The above electromagnets, in addition to permitting the levitation and descent of an automotive ball, also permit omni-directional movement of an automotive ball on the floor, roof, or other plane surface of the motion environment. The method by which this motion occurs is conceptually demonstrated in FIG. 4A, FIG. 4B, and FIG. 4C. The electromagnet labeled 6 in FIG. 4A is activated; this activation causes a magnetic attraction between the electromagnet 6 and the permanent magnet 13 of the motion environment floor. The attraction between the electromagnet 6 and the permanent magnet 13 draws the electromagnet 6 toward the permanent magnet 13 and thereby causes the automotive ball to roll forward in the direction shown by the arrow. This rolling brings the electromagnet 6 as close as possible to the permanent magnet 13, as shown in FIG. 4B. The electromagnet 6 is then deactivated and another electromagnet 5 or 7 may then be used to repeat the process, causing the automotive ball to either roll forward again or backward, respectively. FIG. 4C shows that the automotive ball has rolled forward by one more step relative to the position shown in FIG. 4B, when electromagnet 5 is activated. Other electromagnets may also be coordinately activated and deactivated to cause the automotive ball to move in other directions.

The electromagnets in an automotive ball may also be employed to slow down or stop the automotive ball from rolling by simply accelerating the automotive ball in a direction opposite to its direction of motion. This effective deceleration is performed via the same mechanism described above.

Figure 5:
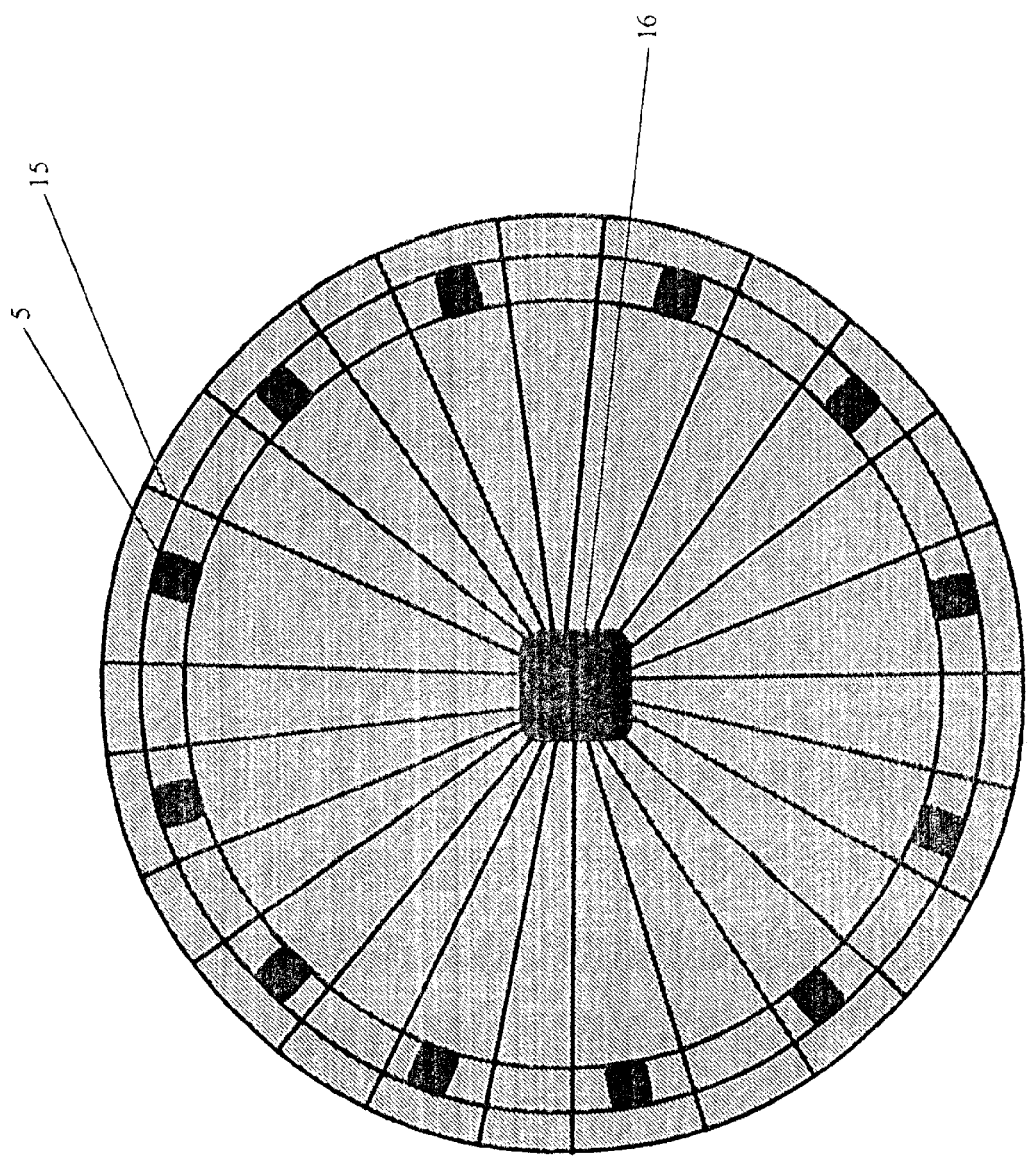
FIG. 5 is a conceptual, cross-sectional view of FIG. 9, showing selected components of the interior of one hemisphere of an automotive ball. Optical fibers terminate at the surface of the automotive ball; and immediately below this surface are electromagnets. At the center of the diagram is a light collection and transmission center.
Figure 9:
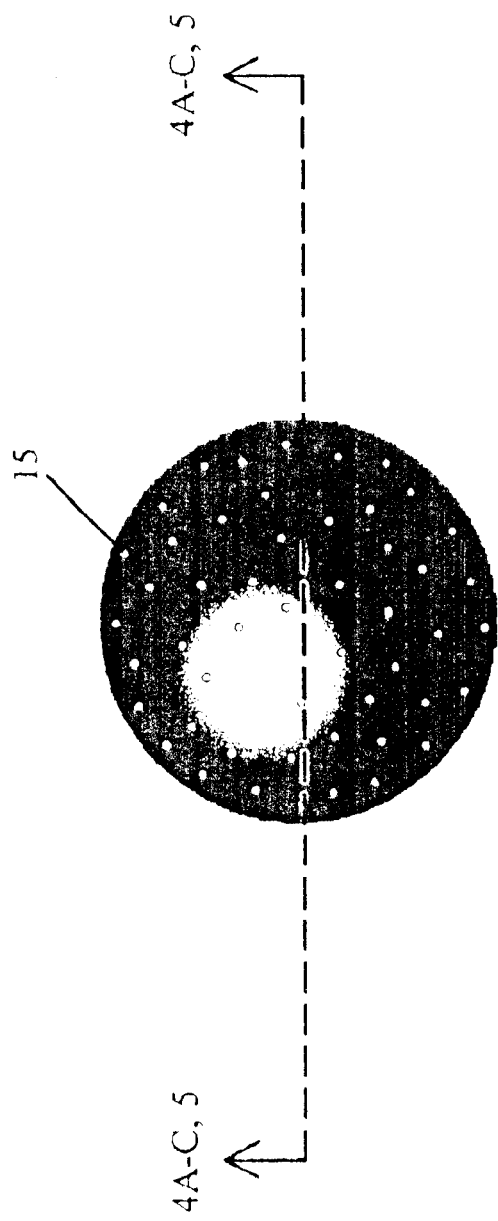
FIG. 9 is a conceptual diagram showing a three-dimensional depiction of an automotive ball. Optical fibers that extend from the interior of the automotive ball terminate at its exterior surface and emit light.
Figure 10:
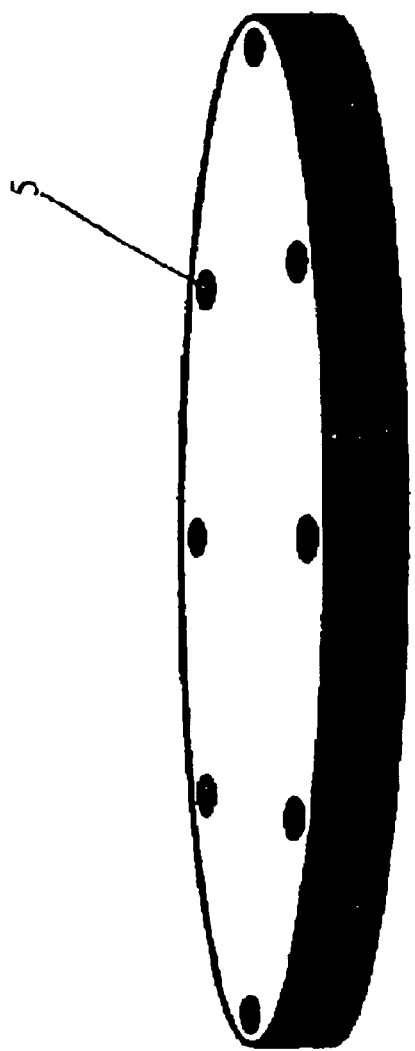
FIG. 10 is a conceptual diagram of an automotive disk, which is equipped with several electromagnets, one of which is labled 5.

Following is a description of a possible construction of the interior of an automotive ball. FIG. 5 is a hemispherical cross-section of an automotive ball shown in FIG. 9, looking directly inward at its interior and depicting selected components of the interior. In FIG. 5, several electromagnets are shown close to the exterior surface of the automotive ball; one of these electromagnets is labeled 5. A light-collecting center 16 is shown at the center of the diagram. The light-collecting center generates electricity for the operation of the automotive ball and contains photo cells (solar cells). These photo cells generate electricity from light present in the motion environment. Light may reach the light-collecting center by means of optical fibers extending from the light-collecting center, as depicted in FIG. 5, and terminating at the surface of an automotive ball as shown in FIG. 9. One of these optical fibers is labeled 15 in both FIG. 5 and FIG. 9.

Lighting in the motion environment that provides light energy to automotive balls may be executed by the use of fluorescent lighting sources positioned above 9 and below 12 the region occupied by automotive balls as shown in FIG. 2.

It is possible that automotive balls in the motion environment may become configured such that sufficient light for proper functioning does not reach one or more automotive balls. This problem may be remedied by the use of temporary energy reservoirs such as an electrical capacitor or rechargeable battery embedded in an automotive ball. In addition or alternatively, the central computer of the game system may be programmed to rearrange automotive balls such that all automotive balls receive adequate light when needed.

As objectives of an automotive ball game include the strategic repositioning of game elements (including automotive balls) in the motion environment, an implementation of such a gaming system may include a control pad(s) by whose means a player(s) controls the movement of the game element(s). Such a control pad interfaces with the central computer. The central computer, in turn, communicates with and directs the operation of game elements. The central computer may also receive positioning and other status information from individual game elements, indicating the relative position of a game element within the motion environment and indicating other status properties, respectively.

Communication between the central computer and game elements is preferably by radio frequency (RF). The frequency or frequencies at which each game element transmits to and receives data from the central computer may be dynamically assigned to each game element when the gaming system is powered or turned on. In that case, each game element may be assigned a unique frequency or frequencies such that each game element may be easily identified by the central computer for communication purposes.

To the benefit of a player(s), each automotive ball game element or group of game elements may be visually identified and distinguished from other automotive ball game elements. This may be done by using a non-permanent, dynamic technique as follows. Optical fibers that extend from the light-collecting center may also carry light to the surface of an automotive ball, in addition to their previously described role. The color of the light radiated at the surface of the automotive ball can be used to distinguish it from other automotive balls. The color of the light radiated by each automotive ball is determined by the relative intensities of three LED's (light-emitting diodes) embedded in an automotive ball's light-collecting center. Red, green, and blue are the primary colors; by varying separately the intensities of the three LED's representing each primary color, many other colors can be derived. Just as was the case with assigning each automotive ball a distinct set of communication frequencies, each automotive ball or group of automotive balls may also be assigned a distinct color. This differential lighting scheme will permit a player(s) to discriminate between automotive balls such as the player's own automotive ball(s) as opposed to an enemy automotive ball(s) of a competitor.

Following is a description of the mechanism by which the relative position of an automotive ball may be determined with respect to other automotive balls in the motion environment.

Figure 8:
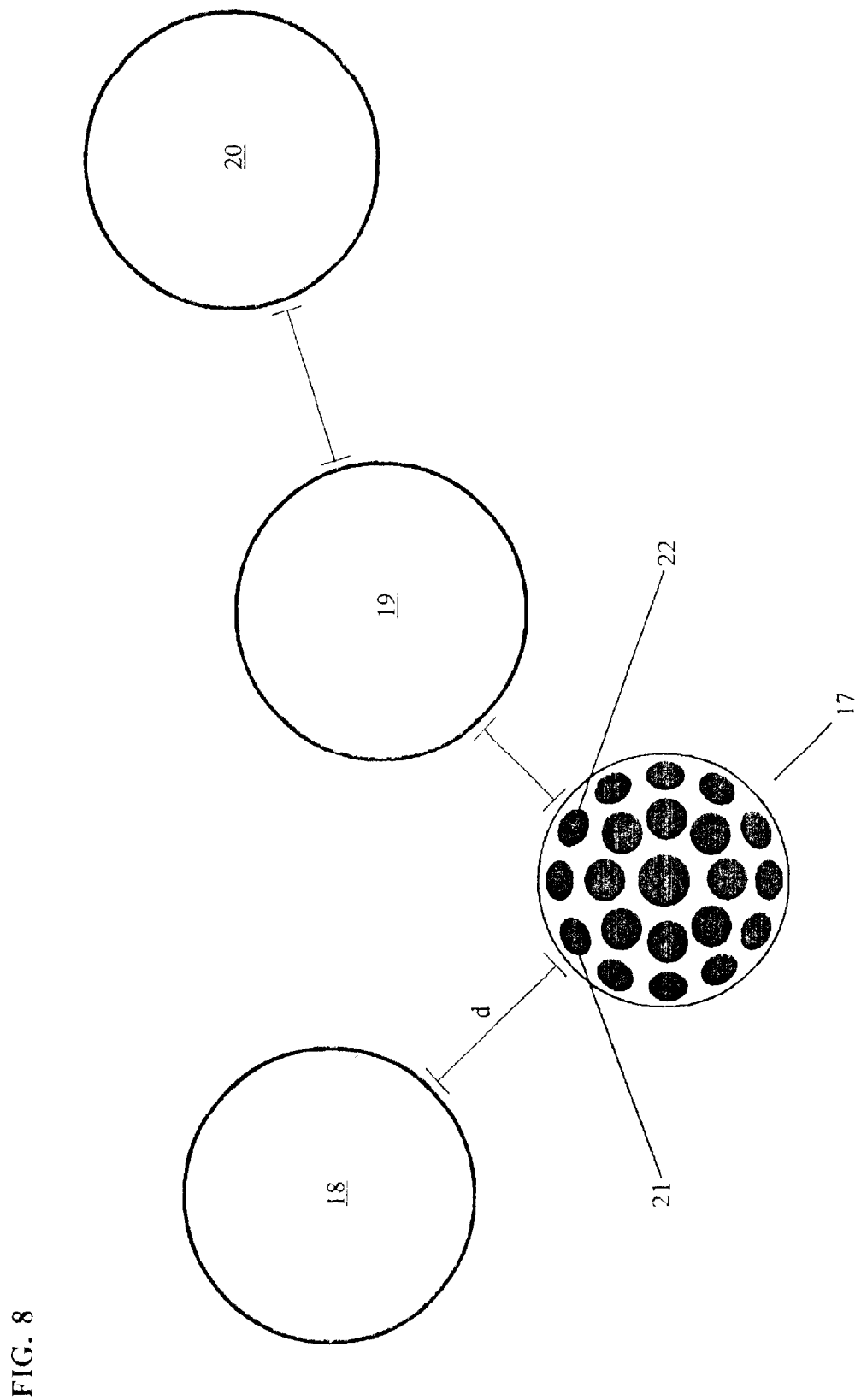
FIG. 8 is a conceptual diagram for demonstrating the method by which an automotive ball may be used to mathematically determine the relative position of other automotive balls electronically. The exterior surface of one of the automotive balls shown has been stripped to expose underlying electromagnets. This automotive ball is also farther away from the viewer, or behind the plane of the other three automotive balls.

Each automotive ball, as described previously, is equipped with an array of electromagnets. These electromagnets, one of which is labeled 5 in FIG. 6, are arranged like points on a spherical surface and reside at an inner layer of the automotive ball, close to the exterior surface of the automotive ball. In FIG. 6, the exterior surface of the automotive balls has been stripped away to show the said inner layer where the electromagnets reside. The same is the case for an automotive ball 17 shown in FIG. 8.

In order to determine the distance separating two automotive balls, one of these automotive balls is operated in transmission mode, and the other is operated in reception mode. The automotive ball that is operating in reception modes measures the position of the automotive ball operating in transmission mode. The automotive ball operating in transmission mode generates time-variable, or fluctuating, magnetic fields by means of its electromagnets. These magnetic fields induce electric currents in the electromagnets of the automotive ball operating in reception mode. The magnitude of the current induced in each electromagnet depends inversely on the distance of that electromagnet from the automotive ball operating in transmission mode. For example, in FIG. 8, electromagnet 21 (in automotive ball 17) is closer to automotive ball 18 than are other electromagnets in automotive ball 17. Therefore, assuming that automotive ball 18 operates in transmission mode and automotive ball 17 operates in reception mode, the largest current will be induced in electromagnet 21 as it is the closest electromagnet to automotive ball 18. By measuring the magnitude of the current in electromagnet 21 and correlating it to a distance-current relationship, the shortest distance between automotive ball 17 and automotive ball 18 can be determined. This surface-to-surface distance is labeled d in FIG. 8 and FIG. 7.

Figure 7:
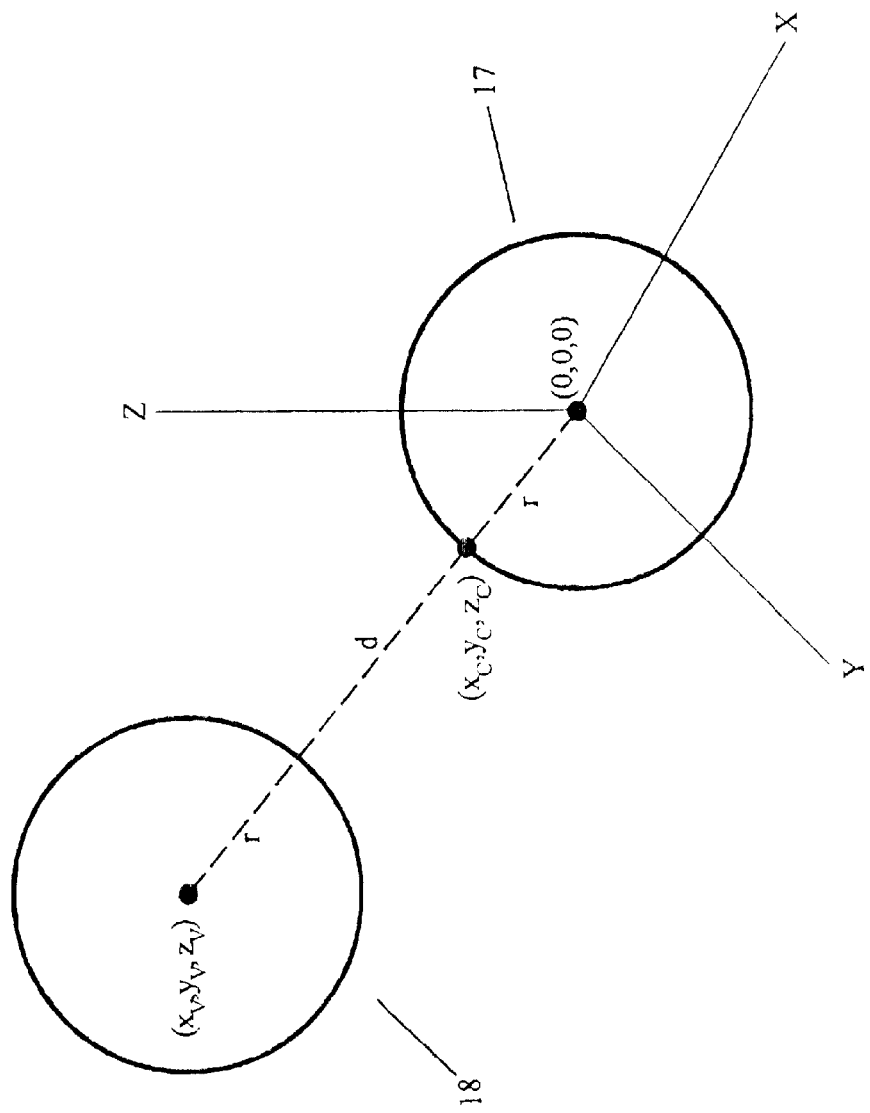
FIG. 7 is a conceptual diagram showing a scheme for calculating the position of one automotive ball relative to another automotive ball.

Knowing the distance between two automotive balls is not sufficient to locate one relative to the other, in three-dimensional (3D) space. In order to locate each automotive ball by assigning it 3D coordinates, the measured distance between two automotive balls is applied in conjunction with other information as follows. Each automotive ball has its own 3D Cartesian coordinate system when it operates in reception mode; and the point (0,0,0) is at the center of the automotive ball. In FIG. 7, automotive ball 17 operates in reception mode. Automotive ball 18 operates in transmission mode.

The position of automotive ball 18, given by the unknown 3D variable $(x_V, y_V, z_V)$, is calculated according to the coordinate system of automotive ball 17, using the following principles. In FIG. 7, a dashed line segment is shown and extends from the center of automotive ball 17 to the center of automotive ball 18. The coordinates of one endpoint of the line segment $(x_V, y_V, z_V)$, which is also the sought coordinates for the center of automotive ball 18, can be calculated if the value of three other variable are known. These variables are: the coordinates of the opposite endpoint of the line segment, the length of the line segment, and the coordinates for a third point contained by the line segment. The values of these variables are known and are as follows. The coordinates of the opposite endpoint of the line segment is (0,0,0) since the line segment extends from the center of automotive ball 17. The length of the line segment is given by r+d+r, or by 2r+d, where r is the radius of the automotive balls and d is the measured distance separating them. Finally, the value for the third point on the line segment is the coordinates of electromagnet 21 and is $(x_C, y_C, z_C)$, where $x_C$, $y_C$, and $z_C$ are known constants. In that case, all the information necessary is available to calculate the value of the 3D variable $(x_V, y_V, z_V)$, which gives the position of automotive ball 18 based on the coordinate system of automotive ball 17. Below is an exemplary vector equation:

$$(x_V, y_V, z_V) = (2r+d)[(x_C, y_C, z_C) - (0, 0, 0)] / $$
$$\sqrt{[(x_C - 0)^2 + (y_C - 0)^2 + (z_C - 0)^2]} + (0, 0, 0)$$
$$= (2r+d)(x_C, y_C, z_C) / \sqrt{(x_C^2 + y_C^2 + z_C^2)}$$

The position of automotive ball 19 is calculated by the same method above, where electromagnet 22 is the closest electromagnet (in automotive ball 17) to automotive ball 19, in this case. However, the position of automotive ball 20 cannot be accurately calculated via automotive ball 17. The problem is that automotive ball 19 blocks, at least partially, the magnetic fields generated by automotive ball 20 such that a weaker signal is detected by electromagnets in automotive ball 17. To remedy this problem, automotive ball 19 is used instead to calculate the position of automotive ball 20.

In effect, the position of automotive ball 20 is known relative to automotive ball 19; the position of automotive ball 19 is known relative to automotive ball 17; and the position of automotive ball 17 is known relative to automotive ball 18 (or vice versa). In that case, a complete map of the positions of all automotive balls can be assembled piece by piece by merging all the position-measurement data gathered by each automotive ball operating in reception mode. Merging of the data to form a composite map may be performed by the central computer, which receives data from each automotive ball.

When an automotive ball operates in transmission mode, it generates magnetic fields that can cause the automotive ball to move, according to mechanisms described previously. This motion is undesirable as it is not intended that automotive balls must necessarily move in transmission mode. This motion is prevented by balancing one hemisphere of an automotive ball against the other such that if the electromagnets in one hemisphere are magnetically attracted in one direction, then the electromagnets in the other hemisphere are magnetically attracted in the opposite direction and with equal force. These opposite forces cancel and therefore the automotive ball does not move. One hemisphere may face the permanent magnet 8 at the roof of the motion environment; and the other hemisphere may face the permanent magnet 13 beneath the floor of the motion environment.

To avoid interference between magnetic fields, only one or a few automotive balls are operated in transmission mode at any given time.

All the operations of an automotive ball described above may be mediated by a controller circuitry or chip embedded in the automotive ball. This controller circuitry is in turn directed by and communicates with the central computer of the game system.

Specific embodiments of the invention have been presented above. Those embodiments do not, however, describe the invention exhaustively as other alternatives and variations to the invention that do not exceed the scope of the claims are possible.

What is claimed is:

1. A spherical object (Automotive Ball) or disk-shaped object containing an array of electromagnets that are distributed lose to the surface of the said object, the object also being equipped with a electronic circuits that facilitate the coordinated operation of the said electromagnets;

the electromagnets each being conventional electromagnets in having one north pole and one south pole, and in having one positive connection and one negative connection to a power supply; and the said electromagnets having a radial geometrical configuration within the said object whereby each electromagnet is located at a distance $r_{cm}$ away from the center of the object and the distance $r_{cm}$ is a constant value that is not zero.

2. The technology of claim 1, wherein an automotive ball is in contact whit one face of the magnetic plane, this magnetic plane having a form where one of its two faces is the north pole and the opposite face is the south pole of the magnetic plane; whereby electromagnets in the said automotive ball that are proximate to the contact point between the automotive ball and the magnetic plane may be sequentially activated, such patterned activation being designed to cause the automotive ball to move on the plane by rolling.

3. The technology of claim 2, wherein an automotive ball resting on a magnetic plane can be levitated above this magnetic plane when one or more electromagnets in the automotive ball is activated, thereby repelling the automotive ball from the magnetic plane, and/or attracting the automotive ball to another magnetic plane located above the first magnetic plane.

4. The technology of claim 2, wherein an automotive ball suspended above a magnetic plane can be motivated to descend toward this magnetic plane when one or more electromagnets in the automotive ball is activated, thereby attracting the automotive ball toward the magnetic plane, and/or repelling the automotive ball from another magnetic plane located above the first magnetic plane.

5. The technology of claim 2, wherein an automotive ball(s) functions in a motion environment that is equipped with the said magnetic plane, and the motion environment may be equipped with additional like magnetic planes.

6. The technology of claim 5, wherein the motion environment is equipped with one or more light sources that illuminate the motion environment, thereby providing light energy to automotive balls in the motion environment.

7. The technology of claim, 5, wherein the motion environment is filled with a liquid that has a density equal to the density of an automotive ball, such that an automotive ball neither sinks nor floats spontaneously the liquid, the automotive ball being thereby effectively exempt from the force of gravity and moving only in response to interactions between magnetic fields generated by the automotive ball and an external magnetic field(s).

8. The technology of claim 5, wherein the said motion environment is equipped with a central computer that monitors and controls events and functions within the motion environment, those events and functions including the activity of automotive balls within the motion environment.

9. The technology of claim 8, wherein a motion environment and automotive balls contained therein are each equipped with an infrared or radio frequency (RF) transceiver circuitry that permits communication of data between the central computer of the motion environment and each automotive ball, and between automotive balls.

10. The technology of claim 9, wherein the said transceiver circuitry in each automotive ball transmits and receives data as carried by infrared light or RF waves, each automotive ball having its own set of unique, dynamically assignable transmission and reception frequencies.

11. The technology of claim 8, wherein a control pad or similar user-interface associated with the central computer of the motion environment permits a player(s) of an automotive ball game to direct the activity of game elements, including the three-dimensional navigation of automotive balls within the motion environment.

12. The technology of claim 1, wherein an automotive is equipped with one or more embedded solar cells that can generate electricity to power the automotive ball.

13. The technology of claim 1, wherein an automotive ball is equipped with one or more embedded light-emitting diodes (LEDs) that provide light for the purpose of color coding the automotive ball so as to distinguish one automotive ball from another.

14. The technology of claim 1, wherein an automotive ball is equipped with optical fibers that extend from the exterior surface of the automotive ball to its interior and thereby can carry light back and forth between the two regions.

15. The technology of claim 1, wherein an automotive ball operating in transmission mode ($AB_{TRANS}$) generates fluctuating magnetic fields by controlled activation of its electromagnets.

16. The technology of claim 15, wherein an automotive ball operating in reception mode ($AB_{RECEP}$) can measure the strength of the said fluctuating magnetic fields generated by $AB_{TRANS}$ when the fluctuating magnetic fields induce electric currents in the electromagnets of $AB_{RECEP}$, the measured strength of said fluctuating magnetic fields being inversely proportional to the distance d separating $AB_{TRANS}$ and $AB_{RECEP}$, and thus can be used to calculate that distance d.

17. The technology of claim 16, wherein the electromagnets of $AB_{RECEP}$ are electronically assigned unique three-dimensional (3D) spatial coordinates of the form $(x_C, y_C, z_C)$ according to their non-changing, or constant, position relative to the center point of $AB_{RECEP}$, the center point of $AB_{RECEP}$ having coordinates (0,0,0).

18. The technology of claim 17, wherein the position, in 3D space, of $AB_{TRANS}$ is electronically calculated with respect to the coordinate system of $AB_{RECEP}$, the said calculated position being represented by the 3D variable $(x_V, y_V, z_V)$, which is the coordinates for the center point of $AB_{TRANS}$ and is variable with relative motion of $AB_{TRANS}$ to $AB_{RECEP}$.

19. The technology of claim 18, wherein the 3D variable $(x_V, y_V, z_V)$ is electronically calculated according to a vector equation of the form $$(x_V, y_V, z_V) = (2r+d)(x_C, y_C, z_C) / \sqrt{(x_C^2 + y_C^2 + z_C^2)},$$

r being the radius of $AB_{TRANS}$ and $AB_{RECEP}$, d the calculated distance separating $AB_{TRANS}$ and $AB_{RECEP}$, and $(x_C, y_C, z_C)$ the electronically assigned 3D coordinates of an electromagnet(s) in $AB_{RECEP}$ that measures the strongest magnetic field from $AB_{TRANS}$.

* * * * *